(12) United States Patent
Pauly (10) Patent No.: US 6,490,865 B2
(45) Date of Patent: Dec. 10, 2002

(54) CENTRIFUGE COMPRESSION COMBUSTION TURBINE

(76) Inventor: Lou Pauly, 460 S. 5$^{th}$ East, Green River, WY (US) 82935

( * ) Notice: Subject to any disclaimer, the term of this patent is extended or adjusted under 35 U.S.C. 154(b) by 10 days.

(21) Appl. No.: 09/835,156

(22) Filed: Apr. 16, 2001

(65) Prior Publication Data

US 2001/0025480 A1 Oct. 4, 2001

Related U.S. Application Data

(63) Continuation-in-part of application No. 09/680,250, filed on Oct. 5, 2000, now abandoned, which is a continuation-in-part of application No. 09/343,503, filed on Jun. 30, 1999, now abandoned.

(51) Int. Cl.$^7$ ............................. F02C 7/00; F04D 17/08
(52) U.S. Cl. .................. 60/726; 415/198.1; 416/DIG. 2
(58) Field of Search .......................... 60/269, 726, 805; 415/198.1, 199.1, 199.2, 199.3; 416/198 R, 198 A, DIG. 2

(56) References Cited

U.S. PATENT DOCUMENTS 2,244,467 A * 6/1941 Lysholm .................. 415/199.2
2,395,704 A * 2/1946 Wislicenus ............... 415/198.1

* cited by examiner

Primary Examiner—Louis J. Casaregola
(74) Attorney, Agent, or Firm—Marcus G. Theodore

(57) ABSTRACT

A centrifuge compression combustion turbine employing curved radial downward sloping impeller blade compressor fan units, which densify in two stages the air entering the turbine before entering the combustor section, or alternatively when placed within the turbine exhaust air stream, converts the energy in the air exhaust stream leaving into rotational energy.

16 Claims, 7 Drawing Sheets

Inlet Air

CENTRIFUGE COMPRESSION COMBUSTION TURBINE

RELATED APPLICATIONS

This application is a continuation-in-part application of the continuation-in-part application entitled "Centrifuge Compressor Gas Turbine" Ser. No. 09/680,250 filed Oct. 5, 2000 (now abandoned) of the parent application entitled "Centrifuge Compressor Gas Turbine" Ser. No. 09/343,503 filed Jun. 30, 1999, now abandoned.

BACKGROUND OF THE INVENTION

1. Field

This invention relates to gas and combustion fired turbines with compressor fans and housings. More particularly it pertains to a two stage compression combustion turbine with a turbocharger compressor associated with the air inlet. It employs curved radial sloping impeller blade compressor units, which initially densify the air before entering an optional further peripheral compression or collection chamber. This compressed air is then directed into the combustion chamber of a turbine. Alternatively, the turbocharger compressor may be located within the turbine exhaust gas stream to convert the energy in the gas stream leaving the turbine into rotational energy. It is particularly suited for use with jet engines.

2. State of the Art

A number of turbocompressors for natural gas fired or combustion turbines, such as the high altitude jet engine of Serriades, U.S. Pat. No. 3,260,046, are known. Lieu, U.S. Pat. No. 5,344,737 discloses an impeller disc vane design with tapered blades to compress gas passing through the crossover duct within the compressor section. Treager, in Aircraft Air Turbine Engine Technology, 1970 by McGraw-Hill, Inc. also discloses an impeller disc vane design with tapered blades to compress gases between the blades. These references do not have a plurality of stacked radial fan blades surrounding a central interior air intake area to function as a centrifugal fan. Lysholm, U.S. Pat. No. 2,244,467 discloses a radial turbine blade design with a central intake area for gases directed therethrough, but does not disclose curved blades with diminishing heights toward the perimeter to compress these gases. Cali, U.S. Pat. No. 3,265,290 discloses an axial flow compressor for jet engines, wherein the weir between the fairing and stator section is eliminated. Rosman, U.S. Pat. No. 3,945,101 discloses a rotor wheel for radial-flow fans and turbines with a center entry area. Fujino, U.S. Pat. No. 4,224,010 discloses a multi-stage turbocompressor with diagonal-flow impellers. Bachl, U.S. Pat. No. 3,226,085 discloses a rotary turbine with an axial flow component with a tangential flow path. O'Connor, U.S. Pat. No. 4,995,787 discloses an axial flow impeller with blades having a pronounced curve design. Wosika, U.S. Pat. No. 4,435,121 discloses a radial impulse turbine having low and high pressure sections. Teshima el al., U.S. Pat. No. 4,274,804 discloses an axial flow turbine with a helical flow path generated and used within the turbine. Seippel el al., U.S. Pat. No. 3,953,148 discloses a configuration of the last moving blade row of a multi-stage turbine, which is dramatically twisted. Pauly, U.S. Pat. No. 5,741,123 discloses a turbocharger compressor fan and housing for use with diesel engines, marine engines, combustion engines, and high altitude aircraft engines. Wislicenus, U.S. Pat. No. 2,395,704 discloses a water pump with curved blades, which is unsuitable for use as a high speed compression combustion turbine.

Of general interest is Quinn, U.S. Pat. No. 5,328,333, which discloses a rotating thrust producing apparatus employing circular foils for producing thrust in an axial direction when rotated.

The invention described below provides a centrifuge compressor combustion turbine with a turbocharger employing a series of compressor units employing curved impeller blades with radially diminishing cross sections to optimize gas collection, rotating thrust and gas densification.

SUMMARY OF THE INVENTION

The invention comprises a centrifuge compressor combustion turbine heat engine in which fuel burns to heat compressed air and the hot air and waste gases to drive a turbine. It employs a series of stacked compressor units having curved fan blades to optimize air collection and rotation densification. These blades not only gather intake air, but compress it between diminishing longitudinal cross sections flow channels between the blades, which may be downward sloping from their inlets to their outlets, or have walls of increasing thickness to radially decrease the cross sectional areas between blades to compress gases as they flow therebetween. After initial blade compression, the air may be further densified in a peripheral compression chamber. These compressor units thus function as a turbocharger and are generally positioned within the inlet air intake. They comprise a curved radial blade compressor system, which simultaneously collects and densifies the air before being further compressed in a peripheral compression chamber before entering a natural gas fired or combustion turbine. Alternatively, the compressor units may be placed after the turbine exhaust to collect the exhaust stream of a natural air or combustion turbine to convert the exiting gas energy into rotational energy.

The centrifuge compressor combustion turbine comprises a turbine frame defining air intake and exhaust openings. A diffuser section is attached to the turbine frame proximate the air intake having a plurality of compressor units. Each compressor unit has a housing defining a central air inlet leading into a peripheral compression chamber having compressed air outlets leading into a compressed air collection chamber. The compressor units are interconnected and operably associated with a turbine drive shaft rotatably mounted within the turbine frame. The drive shaft also supports a combustor section to burn fuel to heat the intake air to drive a fan turbine located on the drive shaft behind the diffuser section. The compression chamber has rotatably mounted therein with seating structure a plurality of interconnected stacked compressor units, each having an impeller attached to a rotatable circular impeller disc drive base. Each impeller disc drive base defines an opening surrounding the central air inlet opening, except for the last, which is covered and attached to the shaft.

In one preferred embodiment, a plurality of curved spaced radial sloping impeller blades having greatest height proximate the central air inlet and least height proximate the air outlets. They are attached to the top of each drive base forming sloping diminishing cross sectional air flow channels between the blades and housing cover. The impeller blades define impeller blade flow channels with air inlets in communication with the central air inlet. The impeller blades also define air outlets in communication with the air collection chamber to direct compressed air into the turbine combustor section. When connected and stacked, the compressor units form an open topped air intake in communication with the central air inlet of each impeller drive base so that the impellers rotate in unison and each air inlet is in alignment and communication with the next successor air inlet. A diffusion disc covers the last air inlet opening, and is attached to the turbine drive shaft with securing means to rotate the compressor unit impellers. The number of the compression units is selected to provide the desired compressed volume throughput into the turbine combustor section.

Thus, the plurality of stacked interconnected impeller compressor units surround and rotate about the central air inlet. The compressor units direct compressed air into the turbine combustor section wherein fuel burns to heat and expand the gases to turn a turbine. The open top of the stacked compressor units is rotatably attached to and in communication with the inlet opening in the frame, when the turbocharger is mounted before the turbine compressor section. Each impeller is mounted and seated to the rotating base of each compression unit such that each impeller is positioned to be in communication with its respective air inlet. A similar compressor system may be employed within the exhaust to convert the energy in the gas stream leaving the turbine into rotational energy.

Preferably, each impeller has a circular drive base impeller disc defining a central opening, which is attached to and surrounds the air inlet opening of the cylindrical support structure. A plurality of curved radial fan blades is then attached to the drive base surrounding the central opening. The curved radial fan blades are mounted on top of the drive base and structured to define air inlets therebetween. The inlet openings are optimally sized to capture a large volume of air from the air inlet. The air is then directed between diminishing flow channels defined by the radial blades for compression there between. These radial blades define an open top and a covered bottom when attached to the drive base. The air inlet opening is aligned and in communication with each respective housing air inlet.

Each fan blade thus defines air inlets leading into diminishing cross sectional channels between the impeller blades and out compressed air outlets therebetween. A frame cover covers the open topped impeller blades to form compression chambers between the blade segments. Compression results in the first preferred embodiment by progressively lowering the height proximate the inlets and cross sectional area between each blade until it is the lowest proximate the blade outlet. The compressor blades have a sloping surface starting with the greatest height proximate the top of the air inlet and diminishing as they extend radially there from in a curved radial sloping wheel configuration such that each impeller fan blade curves away from the disc's direction of rotation.

In the second preferred embodiment, the radial blades have a constant height, but the blade walls have radially increasing thicknesses to progressively narrow the flow channel between the blades from the air inlet to the compressed gas air outlet to similarly compress gases flowing therebetween. Other geometric configurations providing radially curved or combination straight and curved segmented blades may be employed provided they have progressively narrowed flow channels between the blades from the air inlet to the compressed gas air out Net to compress gases flowing therebetween.

The angle of curvature of each blade at the fan blade outlet is the same as that at the inlet to minimize inlet flow losses. Thus, in the first embodiment each compressor blade segment has an inner elevated leading edge and an outer lower trailing edge so the height of each compressor blade decreases from the leading edge to the trailing edge to form with the drive base surface air flow channels, which are covered by the frame cover. As the impeller blades rotate, gases pass through airflow channels of diminishing longitudinal cross-sections to be compressed and directed out compressor air outlets. The dimensions of the diminishing flow channels and air outlets are selectively reduced in cross-sectional area to form the desired compression ratio. For example, an eight inch rise in the inlet opening, and a air outlet opening of ¼ inch results in a compression ratio of 30 to 1. A four inch rise in the inlet opening, and a air outlet opening of ¼ inch results in a compression ratio of 8 to 1. Once the compression ratio is selected and the impeller design structure determined, the number of the impeller compressor units is selected and stacked and fastened together such as by welding, fastening devices, or an outside threaded ring to provide the desired flow through of compressed gases into the turbine combustor section.

In one preferred embodiment, the centrifuge compressor blades should be capable of producing 100 psi before ignition. When turning at 20,000 rpm with a 20 inch to 40 inch diameter radial impeller, every square foot of flow has 144 square inches times 100 psi giving, 14,400 pounds of thrust before ignition. After ignition and expansion, this thrust should be increased by a factor of twenty times to produce 288,000 pounds of thrust per square foot of exhaust. This is three times that of any unclassified jet engine. However, the actual thrust will vary depending upon the rpms, the blade design, and the initial compression.

The frame defines a peripheral compression chamber compressed gas collector reservoir, which surrounds and is in communication with each impeller air outlet to collect compressed air accelerated by the impeller to slow the air down to convert air velocity energy into increased pressure densified air and direct it into the air turbine combustor section. The geometry of the compressions chamber gas collector reservoir may be structured to further increase the pressure of these compressed gases by forcing them through a smaller cross sectional outlet before entering the turbine combustion chamber. Conversely, if attached to the turbine drive shaft and placed to collect turbine exhaust gases, these compressor units act to collect the air flow exhaust energy and convert it into rotational energy.

One preferred layout of the curved impeller design has the blades of the impeller curved on an initial cord of sixty degrees, which allows for maintaining the distance between the blades at a constant distance from the center of the impeller to its outside edge, thereby maintaining the pressure while reducing the turbulence of the air. This is accomplished by dividing the circumference of the outer circular impeller blade drive base into 10 degree segments. Four equidistant concentric circles are then drawn with diminishing radii to serve as layout guides. The first blade circular shape is then drawn by connecting a series of intersection points of the 10 degree radii with the inner, outer and four equidistant intervening concentric circles with a French curve. The first point is the outer circle intersect at the 60 degree segment. The second point is the fourth inner concentric circle intersect with the 50 degree segment. The third point is the third inner concentric circle intersect with a 30 degree segment. The fourth point is the second inner concentric circle intersect with the 20 degree segment. The fifth point is the first inner concentric circle intersect with the 10 degree segment. The sixth point is the inner circle intersect at the 0 degree segment. These six points form the extended radial edge of the outside edge of the impeller blade proximate the air inlet, which gradually changes in curvature toward the outside edge of the impeller blade proximate the air outlet. The next circular blade is then drawn parallel to the first blade starting from the width of the inner blade opening between the adjacent blade, and ending 60 degrees from its extended radius of the edge of the next inner blade.

The number of concentric circles for a layout is dependent upon the diameter of the impeller. More concentric circles and intersection points are needed as the diameter increases in size larger than shown for the above example.

Another preferred embodiment has blades with radially increasing in thickness walls, which are not equidistant apart, but form gradually diminishing width flow channels to further compress the air through diminished width as well as height air outlets. Various curvilinear (combination straight and/or curved segments) blade shapes may be employed, but they must have the same diminishing flow channel relationships and preferably have the trailing edge to intersect a 60 degree chord with the extended radius of the impeller blade leading edge.

The exact layout may be employed by connecting by hand intersecting curves, or via a computer auto cad program, which uniformly spaces the distances between the blades and insures that they intersect a 60 degree chord segment between an extended radii of the inner blade edge and the point of contact with the outer blade edge.

The impeller may be made from a cast titanium slug with a center inlet air opening and slots for the cover machined to specification. A computerized milling machine is then programmed to cut a cord of 60 degrees between each blade making the spacing between the blades equally spaced from the inlet to the outlet of the impeller to form a one piece construction with the back of the impeller laid flat on the milling machine. The height of each impeller in the sloping blade preferred embodiment is preferably not higher than four inches at the highest interior point proximate the inlet, and thereafter gradually sloped to a desired height proximate the outlet to provide the desired compression ratio. An impeller blade cover is then assembled around. the impeller to form a compression unit with a compressed air outlet by machining a raised peg off each blade on top. The impeller blade cover would then have slots made to correspond to the raised pegs. The next process would be to use the spaced metal used to rework the shafts. Next the upper cover is machined and acts to support the next compressor unit while sealing the moving air within the blade channels. This cover also secures to the upper portion of the blades of the impeller, and thus sealed forms an individual compression unit. A plurality of compression units is then assembled as discussed above to provide the desired air compression and flow requirements.

Although the invention is designed primarily to be operated such that the blades curve in the direction of rotation of the circular drive discs, the compressor units may be operated in reverse so that the impeller blades curve opposite the direction of rotation. This mode of operations thrusts the compressed air by mechanical force in addition to centrifugal force.

The invention thus provides a new centrifuge compression combustion turbine configuration, which compresses and directs high volumes of compressed air into the combustor segments of fuel fired or combustion turbines. Compression is accomplished in two stages. First by forcing inlet air through diminishing flow channels between impeller blades to blade compress the air. Second, the blade compressed air may be further compressed in a geometrically restricted peripheral compression chamber collecting the blade compressed air forcing it through a restricted path for further compression before being directed into the combustion chamber.

Alternatively, the compression units of the centrifuge compression turbine can be placed within the turbine exhaust stream to convert gas flow energy into added rotational energy.

DESCRIPTION OF THE ILLUSTRATED EMBODIMENTS

Figure 1:
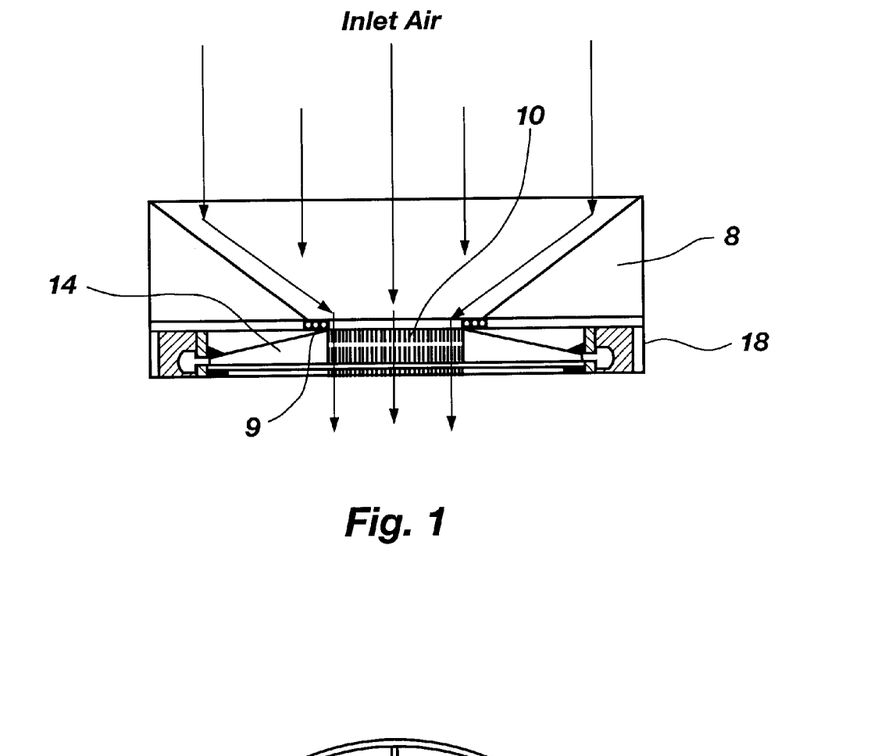
FIG. 1 is a side view of one preferred embodiment of a sloping impeller blade and one compressor unit of the invention.
Figure 2:
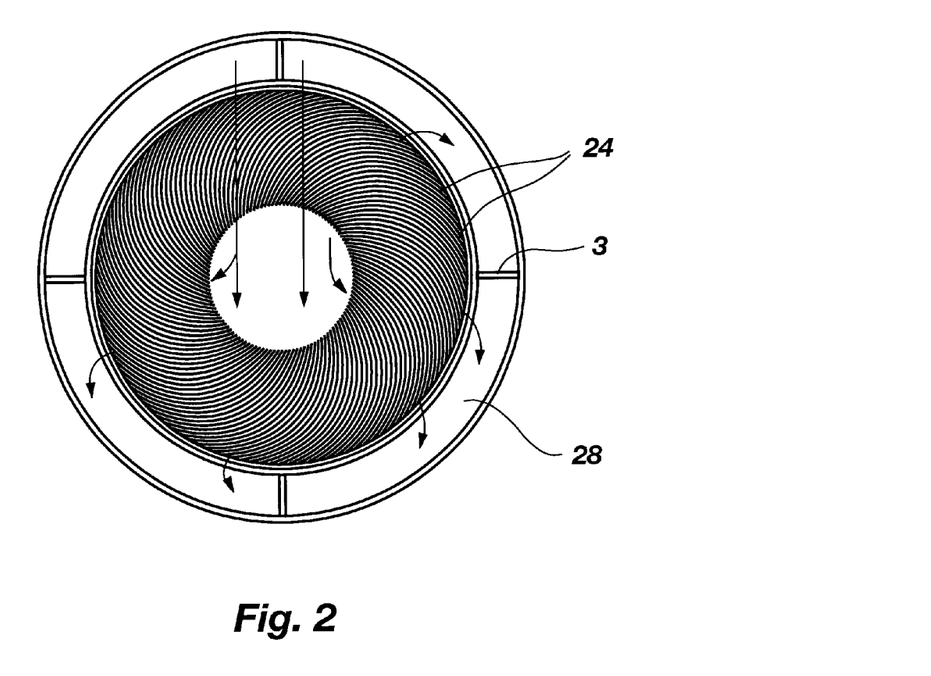
FIG. 2 is a top view of the impeller shown FIG. 1.
Figure 3:
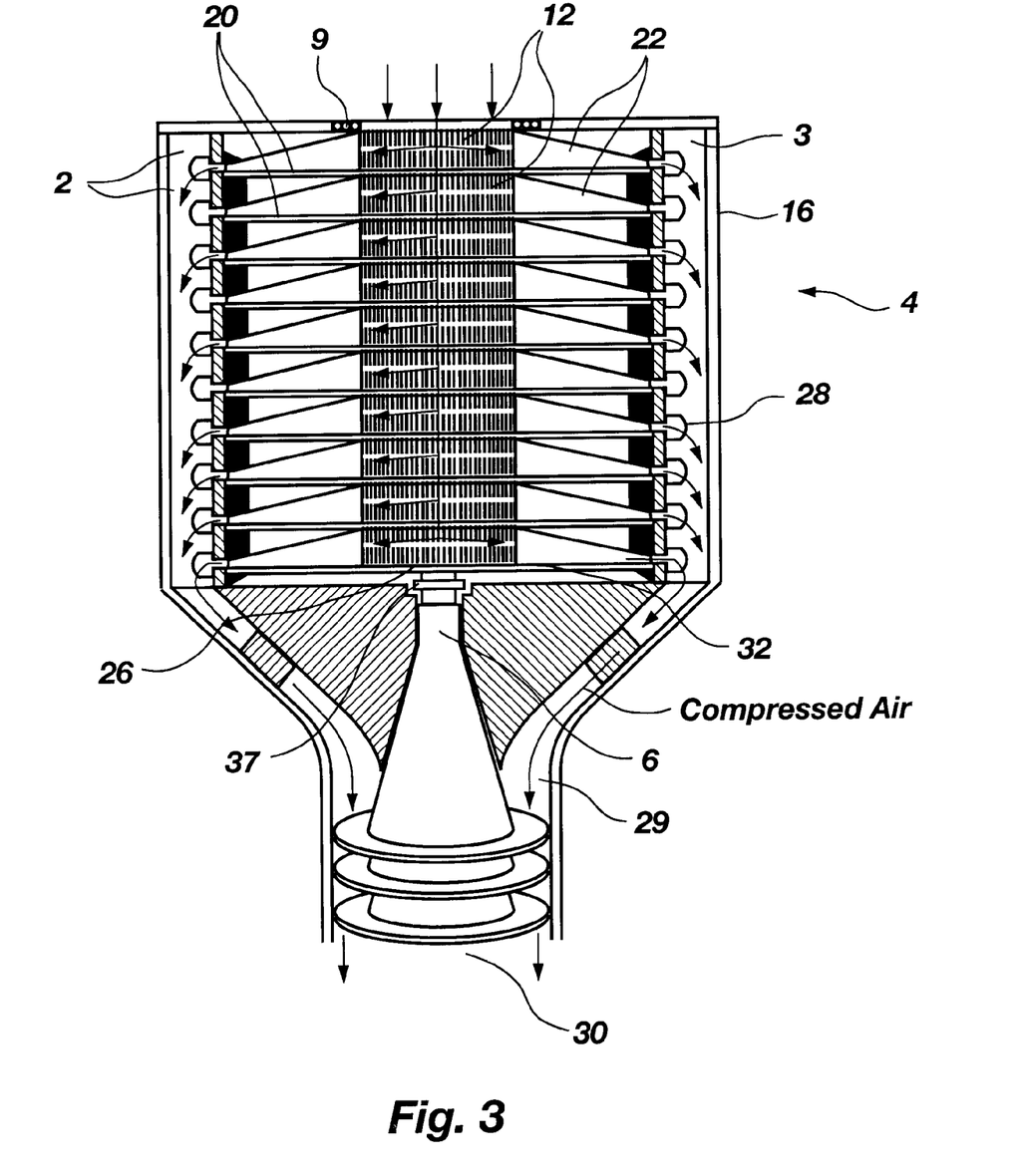
FIG. 3 is a side view of a plurality of stacked compressor units.

FIGS. 1 through 3 are exploded views of a preferred embodiment of a plurality of stacked compressor units 2 associated with compressed air directing gussets 3 of the invention 4 with a second stacked compressor unit 2 turned 90 degrees to show its top view. They are mounted to the shaft 6 of a turbine as shown in FIG. 3. The first compressor unit 2 of the invention 4 is operably associated with a funnel cowling 8 that directs an air stream into an interior air collection chamber 10 defined by the central air inlet 12 of each impeller blade 14. These compressor units 2 are secured together and held in place by a frame 16, which has a top defining the funnel cowling 8 with bearing supports 9 to rotatably mount the lead compressor unit to the funnel cowling 8 preventing compressed air from going out the inlet. Mounted within the frame 16 are a plurality of stacked compressor units 2, each having a housing 18 defining a circumferential central air inlet 12 in communication with and defining the interior air collection chamber 10. Gussets 3 are associated with the frame 16 to direct the compressed air into the combustion chamber.

Figure 4:
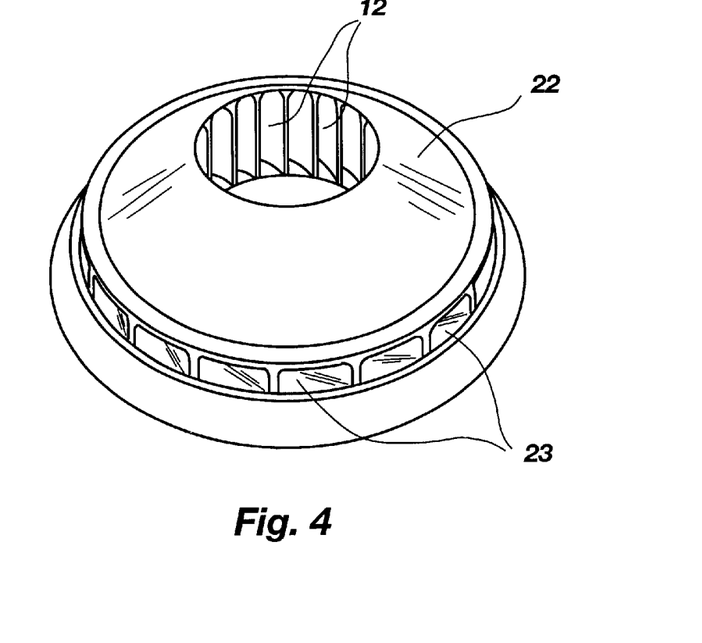
FIG. 4 shows a covered sloping impeller blade.
Figure 5:
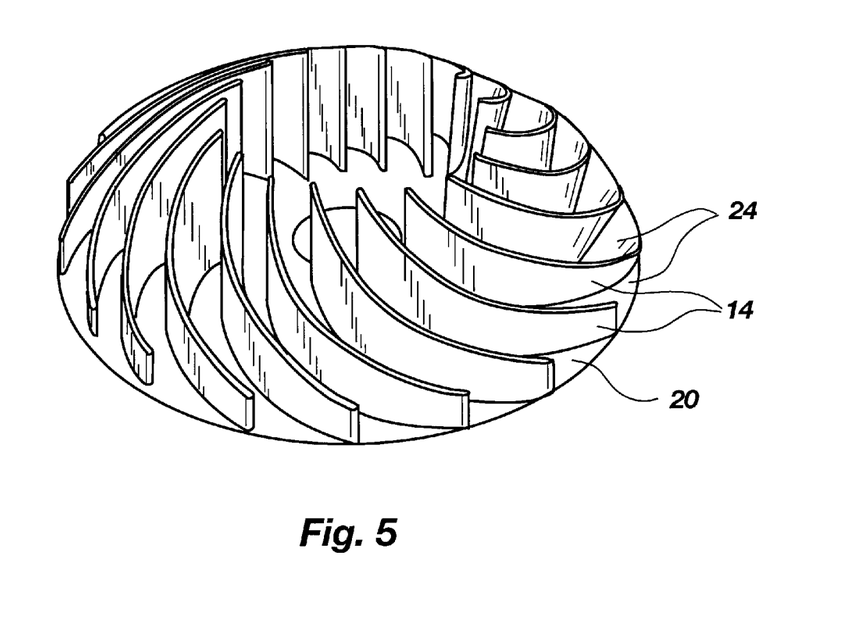
FIG. 5 is a perspective view of the compression chambers between each blade.

The bottom of the central air inlet 12 is defined by its respective circular drive base 20 and covered by a sloping frame top cover 22 shown in FIG. 4 forming compression chambers 24 between each impeller blade 14 of diminishing cross sectional area as shown in FIG. 5. The sloping frame top cover 22 forms air outlets 23 leading into the baffle chamber 28. The impeller blades 14 are attached to each drive base 20 to rotate about the air collection chamber 10. Each air inlet 12 is in alignment and communication with the next successor air inlet 12, except the last air inlet, which has a diffusion disc 26 covering its inlet opening. Not only does the diffusion disc 26 divert inlet air through the impeller blades 14, it also acts to seal the exhaust chamber 30 to reduce back pressure by 40%. If desired, an additional plate, not shown, may be added beneath the diffusion disc 26 and associated with the bearing 37 to seal the exhaust chamber 30 to reduce back pressure.

The number of the compressor units 2 is selected to provide the desired compressed volume throughput into a baffled chamber 28 and then into the combustion chamber 29. These stacked compressor units 2 form a cylindrical intake volume, which is sized and extended by adding additional units or increasing the central inlet 12 size to form a cylindrical volume of air relative to the exhaust areas to produce a mechanical advantage. After fuel is injected and ignited with the compressed gases in the combustion chamber 29, it flows past the turbine blades attached to the shaft 6 into an exhaust chamber 30.

The compressor units 2 are interconnected via circular welds, fasteners, etc. and mounted within an open topped cylindrical support structure 32 attached to the top of the diffusion disc 26. The drive base 20 of each impeller blades 14 of the compressor units 2 is secured to the cylindrical support structure 32 to rotate the impellers 14 in unison. The last compressor unit 2 diffusion disc 36 is attached via a frictionless bearing 37 to the turbine drive shaft 6 just before the combustor chamber 29 of the turbine.

The funnel cowling 8 of the cylindrical support structure 18 is attached to the housing 12, when the turbocharger is mounted to the turbine as a compressor. Air thus enters the funnel cowling 8 through the air inlets 12, and enters the interior collection chamber 10. It is then directed through these central air inlets 12 and enters the impeller blades. 14 for compression and direction into baffled chamber 28 for direction into the turbine combustor section 30 by the gussets 9 which prevents the compressed air from spinning like a cyclone in the outer frame. The grooves in the gussets 9 are to allow the blades 14 to protrude into the gusset 9. Although the gussets 9 are shown straight, they may be curved to utilize the rotating air to deflect following compressed air into the combustion chamber.

Figure 6:
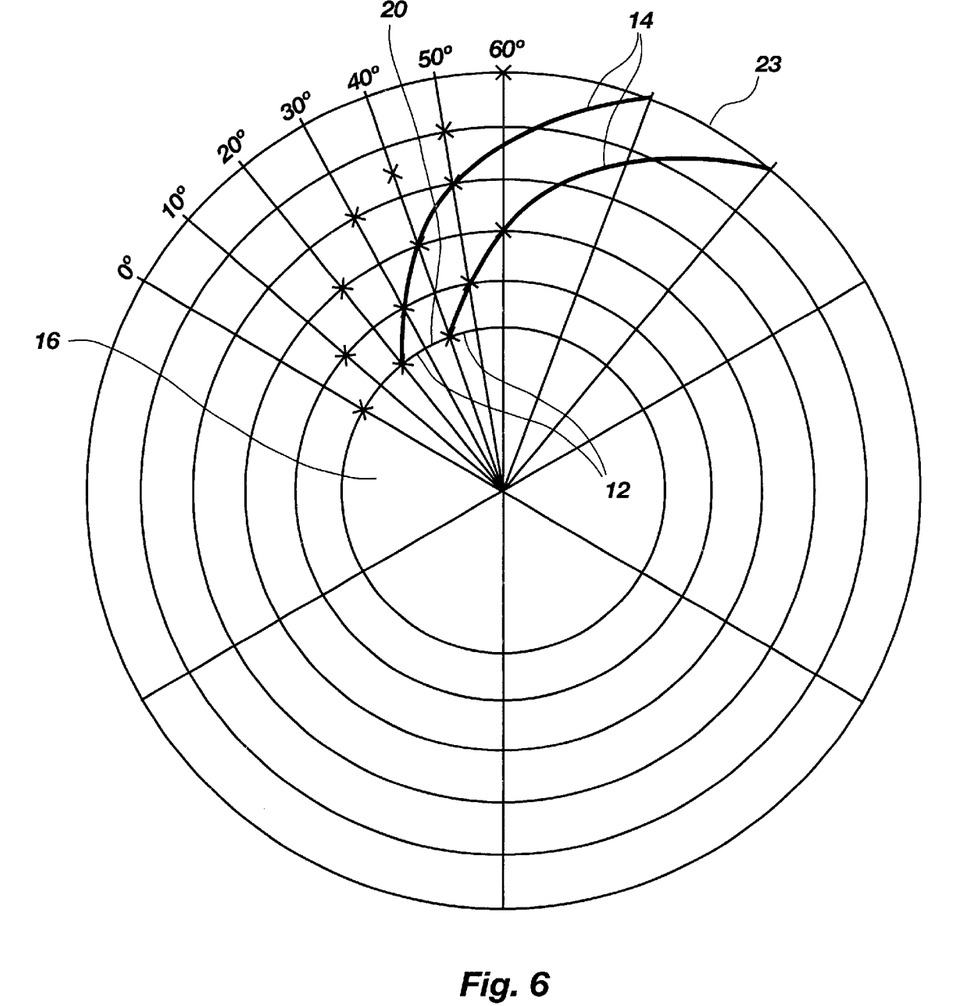
FIG. 6 is a layout of the impeller blade radial construction.

FIGS. 5 and 6 illustrate the shape and structure of each impeller blade 14, which has a drive base 20. The drive base 20 comprises a circular impeller disc surrounding the air collection chamber 12 of approximately 20 inches in diameter. Approximately 150 curved impeller fan blades 14 are mounted on top of each drive base 20 to capture air entering the air inlet 12 and channel it into the compression chambers 24 between the impeller blades 14 for simultaneous compression and direction through an air outlet 23 leading into the baffled collection chamber 28.

Each impeller blade 14 surrounding the air intake opening 12 defines a fixed width fan blade inlet and outlet therebetween, but with differing cross sections. Covering each impeller blade 14 is a cover 22 defined by the frame 16, which covers and surrounds the impeller blades 14. The impeller blades 14 in FIGS. 1–3 have a sloping height, which is optimum proximate the air inlets 12 and extend radially therefrom in a radial sloping wheel configuration shown in perspective view FIG. 5. Each impeller blade 14 curves away from the drive base's 20 direction of rotation. Thus, the angle of curvature at the impeller blade air outlets 24 allows the air entering the impeller blade 14 to be at approximately the same angle as that entering the inlets 12 to minimize inlet losses. Thus, each impeller blade 14 has an inner elevated leading edge and an outer trailing edge so the height of each impeller blade 14 decreases from the leading edge to the trailing edge to form with the seating structure surface flow channels. These flow channels are of diminishing width and are open along their length to form diminishing cross-sections when covered by the frame 16 cover 22. Thus air flowing throughout the length of each channel is first compressed and then forced out impeller blade air outlets 23 into a peripheral compression chamber for further compression. These flow channels between the impeller blades 14 are sized to provide the desired initial compression ratio. For example, for an 8 inch rise in the inlet opening 12, and a air outlet opening 23 of ¼ inch results in a compression ratio of 30 to 1.

FIG. 6 shows the layout method for constructing the turbine impeller blades 14. The turbine impeller blades 14 are constructed by first drawing an outer circle to represent the outside loci of the trailing edge of the impeller blade 14. An inner circle is then drawn the size of the air inlet within the outer circle. Four inner concentric circles are then circumscribed around the inner circle to equally divide the area between the inner and outer circles. The outer circle is then divided into six 60 degree increments. These 60 degree segments are then divided into three equal 20 degree sections. These 20 degree segments may then be divided into 10 degree segments for added precision. Where the 10 degree segments cross the divided inner, outer, and concentric circles, these points determine the curve intercepts of the impeller blades 14. A blade 14 is then drawn representing the desired curvilinear blade shape, with its leading edge defining the air inlet 12 intersecting the inner circle and its outer edge defining a air outlet opening 23 which intersects the 60 degree segment. Consecutive similar curvilinear shaped blades 14 equidistant apart are then inscribed using the circle segment radii intercepts as an aid to draw the corresponding blade 14 segments.

Figure 6A:
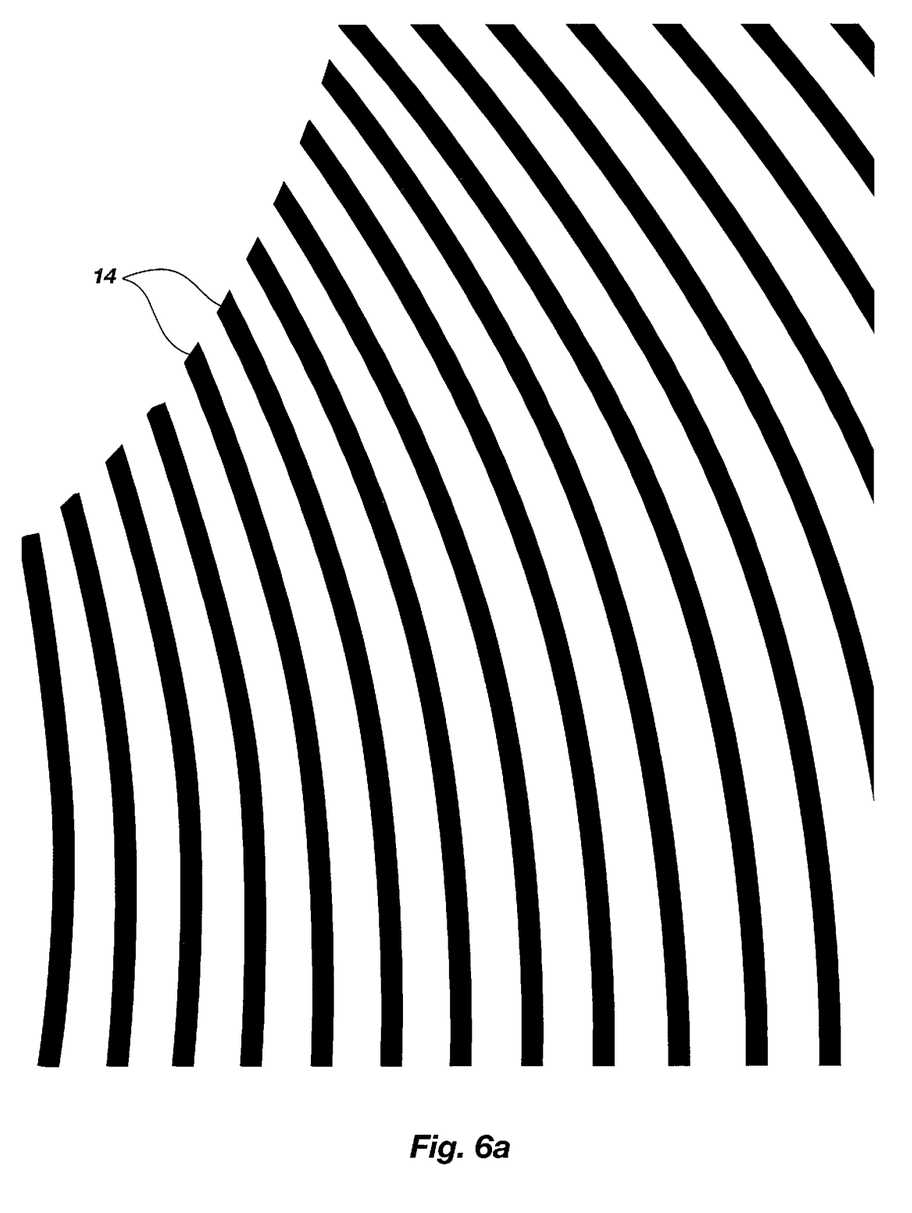
FIG. 6a is an exploded view of the impeller blade radial construction of FIG. 6.

FIG. 6a is an exploded 800% magnified view of a segment of the 150 blades of FIG. 6 showing the uniform cross sectional flow channels between the blades.

Figure 7:
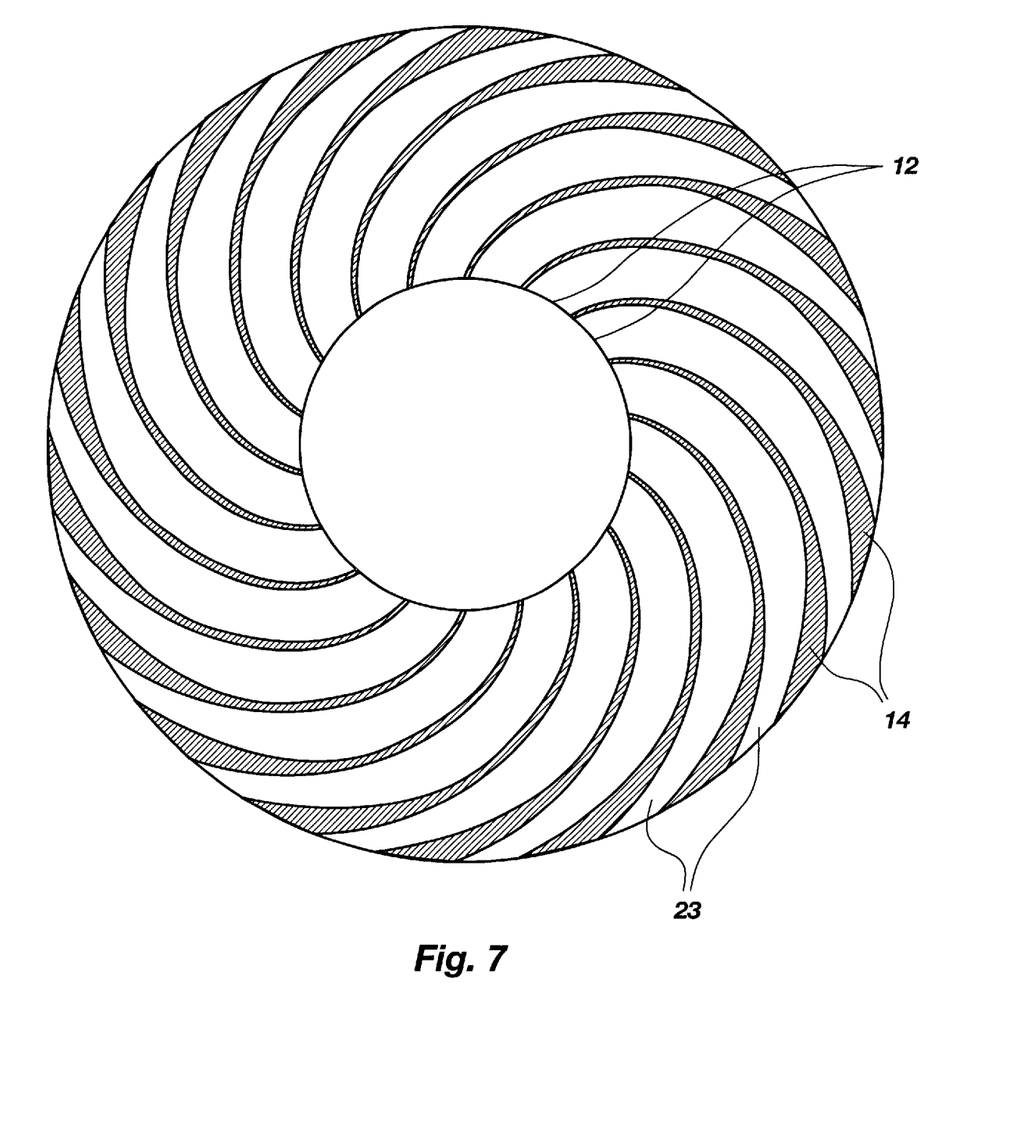
FIG. 7 is a perspective view of another preferred impeller blade embodiment.
Figure 8:
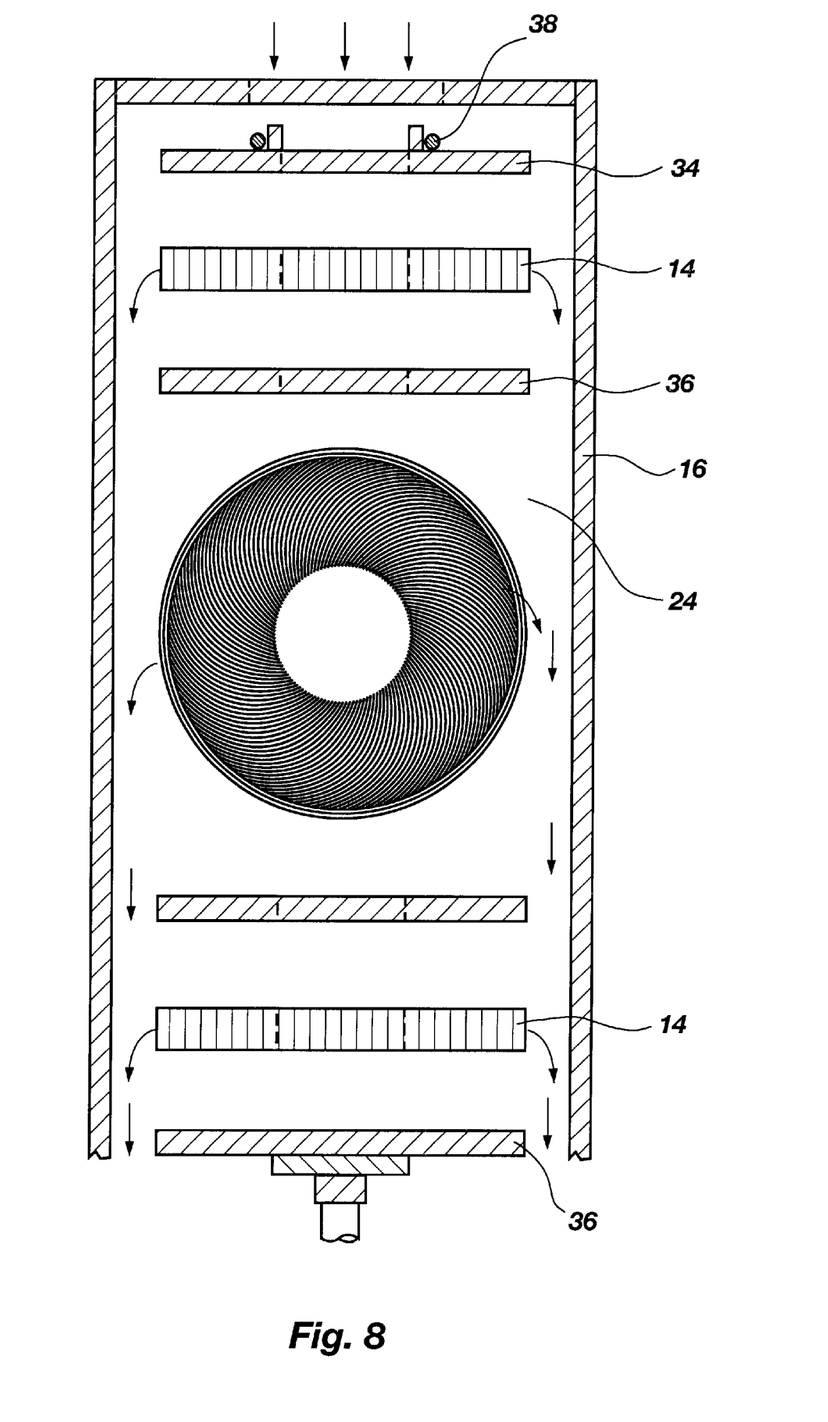
FIG. 8 is a perspective view of the impeller blade of FIG. 8 mounted as stacked compressor units.

FIG. 7 shows another preferred high air compression impeller blade 14 construction wherein the impeller blades 14 have the same height throughout their length, but have increasing sidewall thicknesses as they radiate outward toward the air outlet openings 23. This narrowing provides diminishing cross-sectional surface flow channels between the blades 14 toward the air outlet openings 23 to compress gases passing therebetween. FIG. 8 is a perspective view of the impeller blade 14 of FIG. 7 stack mounted as compressor units 2. Each set of blades 14 is mounted between a top plate 34 and a bottom plate 36 to form a sealed unit around the central air inlet opening 12. These sealed blade 14 compressor units 2 are then welded together into a stacked series to turn together and direct compressed air into the compression chamber 24. This particular construction is less costly to construct and results in a more compact compressor section. To rotatably secure the top inlet 12 these units 2 within the frame 16 central air inlet 12, the top unit 2 has a seal and bearing 38 associated with the top plate 34 as shown.

Other curvilinear shaped blades 14 having straight and curved segments may be employed provided the cross sectional diameters which gradually decrease such that the inlet is greater than the outlet cross-sectional area to provide the desired compression ratios of gases passing therebetween Although this specification has referred to the illustrated embodiments, it is not intended to restrict the scope of the claims. The claims themselves contain those features deemed essential to the invention.

I claim:

1. A centrifuge compression combustion turbine comprising:
   a. a turbine frame defining a central air intake and exhaust openings,
   b. a compressor section attached to and within the turbine frame proximate the air intake and having a plurality of stacked interconnected compressor units to rotate in unison, each having i. a housing with a cover defining a central air inlet in communication with the central air intake and leading into a circumferential compression section in communication with a peripheral compression chamber defined by the surrounding frame, and ii. an impeller mounted within the circumferential compression section having 1. a rotatably mounted circular impeller disc drive base defining an opening surrounding the central air inlet, 2. a plurality of curved spaced radial impeller blades attached to the top of the drive base about the drive base opening defining flow channels having air inlets in communication with air outlets, said flow channels having radially diminishing cross sections between the blades and housing cover to compress gases as they flow between the blades, the impeller blade air inlets in communication with the central air inlet, the impeller blade air outlets and the peripheral compression chamber which collects the compressed gases; each air inlet in alignment and in communication with a successor air inlet, and each impeller blade curving away from the drive base's direction of rotation, c. a diffusion disc covering the last impeller disc drive base air inlet opening, d. a turbine drive shaft rotatably mounted within the turbine frame and attached to the diffusion disc to rotate the impellers and compress the intake air to direct it into the peripheral compression chamber, e. a combustor section housed within the frame and in communication with the peripheral compression chamber with fuel means to burn fuel to heat the compressed gases to drive a turbine located on the drive shaft behind the combustor section, the number of the compressor units selected to provide the required compressed volume throughput into the turbine combustor section.

2. A centrifuge compression combustion turbine according to claim 1, wherein the peripheral compression chamber is structured with a geometrically restricted diminishing flow shape which first collects the densified air and forces it through a restriction to further compress the densified air.

3. A centrifuge compression combustion turbine according to claim 1, wherein the cross sectional areas of the impeller air inlets and the outlets are sized to provide a desired compression ratio.

4. A centrifuge compression combustion turbine according to claim 1, wherein the angle of curvature at the impeller blade air inlet is selected to allow the air entering the impeller to be at approximately the same angle as the curve of the impeller blade to minimize inlet losses.

5. A centrifuge compression combustion turbine according to claim 4, wherein the impeller blades are parallel and spaced equidistant apart.

6. A centrifuge compression combustion turbine according to claim 5, wherein the radial blades are spaced such that an extended radii from its respective inlet opening intersects a 60 degree chord with the trailing edge near the air outlet.

7. A centrifuge compression combustion turbine according to claim 6, wherein the curvature of each turbine blade is determined by:

a. drawing an outer circle corresponding to the outside loci of the trailing edge of the trailing blade, b. drawing an inner circle corresponding to the size of the air inlet, c. inscribing four equidistant apart inner concentric circles between the outer circle and the inner circle, d. dividing the outer circle into six 60 degree increments, and the inner circles into six 10 degree sections, f. marking the beginning of the first pattern blade at the 0 degree intercept of the inner circle, g. marking the second point of the first pattern blade at the 10 degree intercept of the first inner concentric circle, h. marking the third point of the first pattern blade at the 20 degree intercept of the second inner concentric circle, i. marking the fourth point of the first pattern blade at the 30 degree intercept of the third inner concentric circle, j. marking the fifth point of the first pattern blade at 50 degree intercept of the fourth inner concentric circle, k. marking the six point of the first blade at the 60 degree intercept of the outer circle, l. smoothly interconnecting the six points to form a curved shape of the first pattern blade, and m. similarly shaping a plurality of blades and spacing them equidistant apart and parallel to the first pattern blade to form a plurality of parallel blades which equally divide the remaining area of the disc to form the desired number of equidistant flow channels.

8. A centrifuge compression combustion turbine according to claim 7, wherein the impeller blades have inner elevated leading edges and outer trailing edges such that the height of each impeller blade decreases from its leading edge to the trailing edge.

9. A centrifuge compression combustion turbine according to claim 8, wherein the cover and flow channels are sloped along their length with their largest cross sectional areas proximate the air inlet and thereafter diminishing in cross-section area throughout the length of each channel with the smallest cross sectional area proximate the air outlet to compress the air flows passing there through.

10. A, centrifuge compression combustion turbine according to claim 1, wherein the curvilinear impeller blades have the same height and have radially increasing thicknesses toward the air outlets to form radially diminishing cross sectional area flow channels there between.

11. A centrifuge compression combustion turbine according to claim 10, wherein the radial blades are spaced such that an extended radii from a respective inlet opening intersects a 60 degree chord with the trailing edge near the air outlet.

12. A centrifuge compression combustion turbine according to claim 11, wherein the desired compression ratio is determined by diminishing the cross sectional areas along the flow channels such that there is least cross sectional area proximate the impeller air outlets and the largest corresponding cross-section area proximate the impeller air inlets to compress gases passing there between.

13. A centrifuge compression combustion turbine according to claim 1 wherein the diffusion disc acts to seal the exhaust chamber to reduce back pressure.

14. A centrifuge compression combustion turbine according to claim 13 including an additional plate mounted beneath the diffusion disc and associated a bearing to seal the exhaust chamber to reduce back pressure.

15. A centrifuge compression combustion turbine according to claim 1 wherein the number of the compressor units is selected to form the desired cylindrical intake volume of air relative to the cross sectional areas of the exhaust outlets to produce a mechanical advantage.

16. A centrifuge compression combustion turbine comprising:

a. a turbine frame defining a central air intake and exhaust openings,
b. a compressor section attached to and within the turbine frame proximate the air intake and having a plurality of stacked interconnected compressor units to rotate in unison, each having
    i. a housing with a cover defining a central air inlet in communication with the central air intake and leading into a circumferential compression section in communication with a peripheral compression chamber defined by the surrounding frame, and
    ii. an impeller mounted within the circumferential compression section having
        1. a rotatably mounted circular impeller disc drive base defining an opening surrounding the central air inlet,
        2. a plurality of curved spaced radial impeller blades attached to the top of the drive base about the drive base opening defining flow channels having air inlets in communication with air outlets, said flow channels having radially, diminishing cross sections between the blades and housing cover to compress gases as they flow between the blades, the impeller blade air inlets in communication with the central air inlet, the impeller blade air outlets and the peripheral compression chamber which collects the compressed gases; each air inlet in alignment and in communication with a successor air inlet, and each impeller blade curving toward the drive base's direction of rotation.
c. a diffusion disc covering the last impeller disc drive base air inlet opening,
d. turbine drive shaft rotatably mounted within the turbine frame and attached to the diffusion disc to rotate the impellers and compress the intake air to direct it into the peripheral compression chamber, and
e. a combustor section housed within the frame and in communication with the peripheral compression chamber with fuel means to burn fuel to heat the compressed gases to drive a turbine located on the drive shaft behind the combustor section, the number of the compressor units selected to provide the required compressed volume throughput into the turbine combustor section and compress air by mechanical force in addition to centrifugal force.

* * * * *